US009908797B2

(12) United States Patent
Tartakovsky

(10) Patent No.: US 9,908,797 B2
(45) Date of Patent: Mar. 6, 2018

(54) WASTE TREATMENT SYSTEM

(71) Applicant: EPIC CLEANTEC INC., San Francisco, CA (US)

(72) Inventor: Igor Tartakovsky, San Francisco, CA (US)

(73) Assignee: EPIC CLEANTEC INC., San Francisco, CA (US)

(*) Notice: Subject to any disclaimer, the term of this patent is extended or adjusted under 35 U.S.C. 154(b) by 752 days.

(21) Appl. No.: 14/255,764

(22) Filed: Apr. 17, 2014

(65) Prior Publication Data

US 2015/0299009 A1 Oct. 22, 2015

(51) Int. Cl.
*C02F 1/72* (2006.01)
*C02F 11/06* (2006.01)
(Continued)

(52) U.S. Cl.
CPC .................. *C02F 1/72* (2013.01); *C02F 9/00* (2013.01); *C02F 11/06* (2013.01); *C02F 11/12* (2013.01);
(Continued)

(58) Field of Classification Search
CPC .... C02F 1/02; C02F 1/025; C02F 1/72; C02F 2103/005; C02F 2201/008; C02F 2303/04; C02F 9/00; C02F 9/005; C02F 11/06; C02F 11/10; C02F 11/12; C02F 11/121; C02F 11/14; E03F 14/18; E03F 5/14;
(Continued)

(56) References Cited

U.S. PATENT DOCUMENTS 3,272,740 A * 9/1966 Gitchel ..................... C02F 3/28
210/180
3,687,646 A * 8/1972 Brent et al. ............. C02F 11/10
110/220

(Continued)

FOREIGN PATENT DOCUMENTS

WO 2009/057108 5/2009
WO 2013/019444 2/2013

OTHER PUBLICATIONS

Perry et al. "Perry's Chemical Engineers' Handbook: Seventh Edition" (1997), 19-13.*
(Continued)

*Primary Examiner* — Lucas Stelling
(74) *Attorney, Agent, or Firm* — Wilson Sonsini Goodrich & Rosati

(57) ABSTRACT

A waste treatment system may include a liquid separator for removing water from solid waste, a mixing tank connected to the liquid separator for mixing the solid waste with an oxidizing agent, a heat exchanger connected to the mixing tank for collecting heat generated by an exothermic reaction caused by mixing the oxidizing agent with the solid waste, and a sanitizer connected to the liquid separator to sanitize the water removed from the solid waste. A waste treatment method may involve separating water from solid waste in a liquid separator, mixing the solid waste from the liquid separator with an oxidizing agent in a mixing tank connected to the liquid separator to cause an exothermic reaction, collecting heat from the exothermic reaction in a heat exchanger coupled with the mixing tank, and sanitizing the water from the liquid separator in a sanitizer.

8 Claims, 2 Drawing Sheets

(51) Int. Cl.
*C02F 11/12* (2006.01)
*C02F 9/00* (2006.01)
*E03B 1/04* (2006.01)
*E03C 1/122* (2006.01)
*E03C 1/126* (2006.01)
*E03F 5/14* (2006.01)
*E03F 5/18* (2006.01)
*C02F 103/00* (2006.01)

(52) U.S. Cl.
CPC ............ *E03C 1/126* (2013.01); *E03C 1/1222* (2013.01); *E03F 5/14* (2013.01); *E03F 5/18* (2013.01); *C02F 2103/005* (2013.01); *C02F 2201/008* (2013.01); *C02F 2303/04* (2013.01); *E03B 2001/045* (2013.01); *E03C 2201/40* (2013.01)

(58) Field of Classification Search
CPC .... E03F 5/18; E03B 7/07; E03B 7/074; E03B 7/078; E03B 2001/045; E03C 2001/005; E03C 1/122; E03C 1/1222; E03C 1/126; E03C 2201/40
See application file for complete search history.

(56) References Cited

U.S. PATENT DOCUMENTS

| | | | |
|---|---|---|---|
| 3,931,012 A | 1/1976 | Huse | |
| 4,049,545 A * | 9/1977 | Horvath | C02F 1/52 210/665 |
| 4,162,218 A | 7/1979 | McCormick | |
| 4,359,789 A | 11/1982 | Roberts | |
| 5,573,677 A | 11/1996 | Dembrosky | |
| 5,916,437 A | 6/1999 | Levitin | |
| 6,383,369 B2 * | 5/2002 | Elston | C02F 9/00 210/104 |
| 6,393,775 B1 | 5/2002 | Staschik | |
| 6,702,942 B1 * | 3/2004 | Nield | E03B 1/04 210/416.1 |
| 8,096,597 B2 | 1/2012 | Shoseyov et al. | |
| 2002/0020677 A1 | 2/2002 | Noll | |
| 2004/0159608 A1 | 8/2004 | Hoffland | |
| 2012/0080383 A1 * | 4/2012 | Kesler | C02F 11/08 210/665 |
| 2013/0146513 A1 | 6/2013 | Shoseyov et al. | |
| 2013/0306575 A1 * | 11/2013 | Foster | C02F 11/06 210/758 |

OTHER PUBLICATIONS

International Search Report issued on International Application Serial No. PCT/US14/034560, (dated Jan. 15, 2015) pp. 1-3.
Written Opinion of the International Searching Authority issued on International Application Serial No. PCT/US14/034560, (dated Jan. 15, 2015) pp. 1-9.
Office Action dated Dec. 29, 2017 for U.S. Appl. No. 15/480,868.
European Search Report and Search Opinion dated Dec. 6, 2017 for European Patent Application No. EP14889529.5.

* cited by examiner

| KEYED NOTES | |
|---|---|
| 1 BLACK WATER FROM BUILDING. | 7 HEAT EXCHANGER. |
| 2 EMERGENCY BYPASS TO CITY SEWER. | 8 TO DHW STORAGE. |
| 3 HOLDING TANK. | 9 FERTILIZER OUT. |
| 4 LIQUID SEPARATOR. | 10 SANITIZING TANK. |
| 5 MIXING TANK. | 11 GREYWATER FOR TOILET FLUSHING. |
| 6 OXIDIZING AGENT. | |

WASTE TREATMENT SYSTEM

FIELD

The present application relates to waste management systems and methods. More specifically, the application relates to waste treatment systems and methods using an oxidizing agent.

BACKGROUND

Two significant challenges in urban development are processing human and animal waste and providing adequate supplies of usable water. Treatment of waste, or "wastewater," in urban environments, such as commercial and residential buildings, is a specific challenge. Wastewater is typically referred two in two classes—greywater and blackwater. Greywater, or "sullage," is defined as wastewater generated from sinks, showers, baths, laundry, dishwashers and the like, which can be recycled on-site for uses such as toilet flushing, landscape irrigation and constructed wetlands. Blackwater refers to the discharge from toilets—i.e., water containing human waste. In commercial and residential buildings, grey-water and black-water are removed together, using a shared sewage system, to be treated at centralized waste treatment plants, before being returned to the environment at large. With anticipated increases in population and associated waste generation, waste management becomes one of the most critical aspects of sustainable development.

At the same time, there is a critical need to provide more and more potable water for urban growth. Many urban areas struggle to find enough water for the needs of their residents. Significant water conservation will be required to preserve freshwater to offset the limited supply and rising cost of potable water resources.

India provides just one example of the increasing need for wastewater management and potable water. India is the second largest country in the world, with a population of over 1.2 billion. It has one of the fastest growing economies in the world, recording over 896% growth over the last three years. Despite, or in some cases because of, this explosive growth, a large percentage of the Indian population still does not have access to safe water. On one hand, the pressures of development are changing the distribution of water in the country. On the other hand, access to adequate water has been cited as the primary factor responsible for limiting development. Only about half of the cities in India are supplied with piped water. For cities that have a population of between one and five million, their municipal authorities distribute water for only a few hours per day. The few hours that water is available, inadequate pipe pressure makes water delivery a struggle.

Meanwhile, the release of untreated wastewater in India has resulted in increased pollution and depletion of clean water resources. The most polluting sources of untreated wastewater are city sewage systems and industrial waste discharged into rivers. The facilities to treat wastewater are not adequate in any city in India. Presently, only about 10% of the waste water generated is treated, while the rest is discharged as-is into bodies of water.

Human and animal solid waste (feces) is composed of organic matter, which at least in theory could be incinerated or at least sterilized to eliminate bacterial activity and bad odor. A major problem associated with fresh feces, however, is their high water content, which inhibits incineration and unfortunately provides a good medium for bacterial growth and propagation. Furthermore, the high water content makes the feces sticky and dirty. Attempting to burn fresh feces by an external heat source, such as a gas burner, typically results in formation of an external layer of inorganic matter that insulates the wet interior and inhibits heat transfer and combustion thereto. Efficient heat transfer to the interior parts of the feces and water evaporation therefrom are essential components of fecal disposal by heat.

Innovators have previously attempted to circumvent this solid waste disposal challenge by mixing an oxidizing agent (e.g., potassium permanganate) with the waste to generate heat within the waste. This innovation is described for use on a small scale, in a pet waste collection device, in U.S. Pat. No. 8,096,597, which is hereby incorporated by reference in its entirety. No one, however, has developed a related or similar system or method for use in larger scale environments.

Therefore, it would be advantageous to have improved waste treatment systems and methods. Ideally, these systems and methods would provide for efficient treatment of greywater and/or blackwater treatment and would also conserve water. It would also be ideal if such systems could be installed on-site in commercial or residential buildings or in a portable configuration on a truck or other vehicle. At least some of these objectives will be met by the embodiments described below.

BRIEF SUMMARY

Systems and methods for treating sewage (or "waste" or "wastewater") are described herein. Some embodiments are particularly suited for on-site installation and use at large commercial and residential buildings, while other embodiments may be installed on trucks for portable use. The systems and methods generally provide for an on-site wastewater treatment process that addresses two key issues: waste treatment and water conservation.

The embodiments described herein use commonly available chemicals and have low maintenance requirements. Various advantages of the embodiments described herein are: they provides an efficient, cost-effective, on-site sewage treatment system for large commercial and residential buildings; they capture usable greywater for toilet flushing; they capture heat to be used in generating domestic hot water; and they generally conserve water and energy.

In one aspect, a waste treatment system may include: a liquid separator for removing water from solid waste; a mixing tank connected to the liquid separator for mixing the solid waste with an oxidizing agent; a heat exchanger connected to the mixing tank for collecting heat generated by an exothermic reaction caused by mixing the oxidizing agent with the solid waste; and a sanitizer connected to the liquid separator to sanitize the water removed from the solid waste. Some embodiments may also include a holding tank connected between a sewage system of a building and the liquid separator to hold waste from the sewage system before directing the waste into the liquid separator.

Some embodiments may further include: a first pipe connecting the holding tank with the liquid separator; a second pipe connecting the liquid separator with the mixing tank; a third pipe connecting the liquid separator with the sanitizer; a fourth pipe leading out of the heat exchanger to carry water heated from the heat exchanger; and a fifth pipe leading out of the sanitizer. Optionally, the system may include an emergency bypass channel connected to the building sewage system, for diverting the waste to a public sewer system in case of failure of the waste treatment system. The system may also further include a pump, for pumping the sanitized water toward the building for use as sanitized greywater.

In various embodiments, the mixing tank may be any suitable commercial mixer, such as but not limited to a high speed mixer, ribbon mixer, plough mixer, conical screw mixer, conical ribbon mixer, double shafts paddle mixer or continuous mixer. Optionally, some embodiments may also include a heat source connected to the mixing tank for providing heat to the solid waste before or during mixing of the solid waste with the oxidizing agent.

The oxidizing agent may be potassium permanganate or any other suitable, safe oxidizing agent. In some embodiments, the system also includes a supply of the oxidizing agent. The system may also optionally include an oxidizing agent container connected to the mixing tank for holding the oxidizing agent before mixing with the solid waste. The system may also include a heat outflow channel connected to the heat exchanger for allowing the heat generated by the exothermic reaction to be applied to a domestic hot water supply.

In another aspect, a portable wastewater treatment system configured and sized to be placed on a motorized vehicle may include: a sewer collection hose for connecting the wastewater treatment system to a sewer system; a sewer pump connected to the sewer collection hose for pumping waste from the sewer into the wastewater treatment system; a wastewater holding tank connected to the sewer pump for holding the wastewater; and a mixing tank connected to the wastewater holding tank for mixing the solid waste with an oxidizing agent. In some embodiments, the system may also include an outflow channel connected to the mixing tank for allowing at least one of processed solid or processed liquid to be directed out of the mixing tank.

Optionally, the system may further include a liquid separator connected between the holding tank and the mixing tank for separating water from solid waste. Such an embodiment may also include a water outflow channel connected to the liquid separator for allowing the water to flow out of the separator. In some embodiments, the system may be sized and configured to fit on a back of a truck. In various embodiments, the mixing tank may be any suitable commercial mixer, such as but not limited to those listed above. The system may also include a heat exchanger connected to the mixing tank for receiving and collecting heat generated from an exothermic reaction caused by mixing the oxidizing agent with the waste. Again, the oxidizing agent may be potassium permanganate, the system may optionally include a supply of the oxidizing agent, and the system may optionally include an oxidizing agent container connected to the mixing tank for holding the oxidizing agent before mixing with the solid waste.

In another aspect, a waste treatment method may involve: separating water from solid waste in a liquid separator; mixing the solid waste from the liquid separator with an oxidizing agent in a mixing tank connected to the liquid separator to cause an exothermic reaction; collecting heat from the exothermic reaction in a heat exchanger coupled with the mixing tank; sanitizing the water from the liquid separator in a sanitizer; and channeling the sanitized water out of the sanitizer. The method may further include, before separating the water from the solid waste, receiving waste from a building sewer system in at least one holding tank, and channeling the waste from the at least one holding tank to the liquid separator.

In one embodiment, the method also involves applying the heat from the heat exchanger to a source of domestic hot water connected to the heat exchanger. The method may also optionally involve channeling the sanitized water into a water system for use as toilet water. In some embodiments, the method also includes collecting processed solid waste from the mixing tank in a collection tank. Optionally, the method may further involve providing processed solid waste from the mixing tank for use as fertilizer.

In some embodiments, the method may further include detecting an problem in a waste treatment system used to perform the method and diverting the waste from a building sewer system into a public sewer system. In some embodiments, mixing the solid waste with the oxidizing agent involves mixing the solid waste with potassium permanganate. In some embodiments, the method is performed by a waste treatment system located in or near a commercial or multiple-unit residential building. Alternatively, the method may be performed by a portable waste treatment system located on a motorized vehicle. In this type of embodiment, the method may optionally further involve pumping the wastewater out of a sewer system into a holding tank before separating the water from the solid waste.

These and other aspects and embodiments will be described in further detail below, in reference to the attached drawing figures.

DETAILED DESCRIPTION

The various embodiments of a waste treatment system and method described herein provide for waste treatment with improved efficiency and use of water and energy. Some embodiments of the system may be located on-site at a commercial or residential building, while others may be small enough to fit on the back of a flatbed truck or other motorized vehicle. The various embodiments involve mixing solid waste with an oxidizing agent to generate heat from an exothermic reaction. In some embodiments, the system collects the generated heat and provides it as usable energy, such as for heating domestic hot water. In some embodiments, the treated solid waste may be used as fertilizer. Greywater that is separated from the solid waste during the treatment process may be sanitized and used for toilets, watering landscaping or other environmentally safe uses. The various embodiments may be used in any of a large number of settings and locations to provide efficient and effective waste treatment.

The terms "waste," "wastewater" and "sewage" are sometimes used interchangeably in this application. Unless these terms are specifically described as having a particular meaning, they should be interpreted as being interchangeable.

Figure 1:
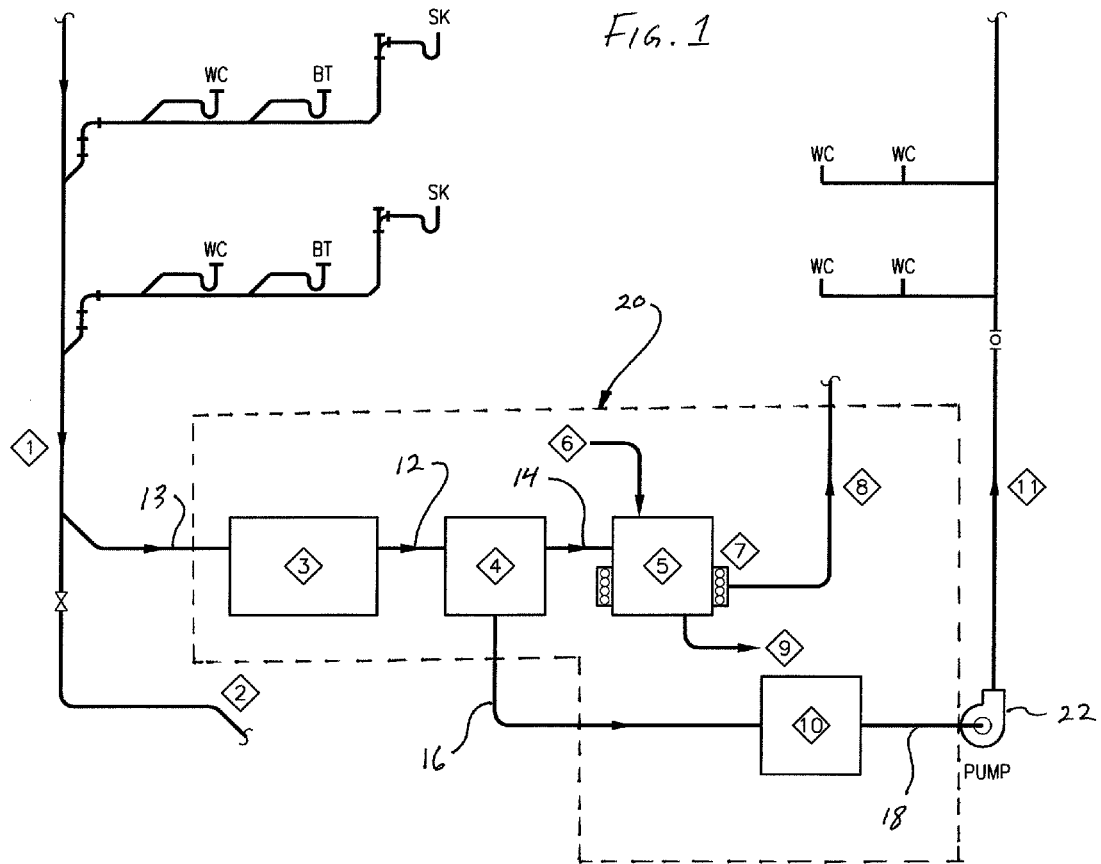
FIG. 1 is a system/flow diagram, illustrating an on-site waste treatment system and flow of sewage through the system, according to one embodiment.

Referring to FIG. 1, in one embodiment, a waste treatment system 20 may include one or more holding tanks 3, a liquid separator 4, a mixing tank 5, an oxidizing agent 6, a heat exchanger 7, a heated water outflow channel 8, and a sanitizing tank 10. Holding tank 3 may be connected with a building sewer system 1 via one or more connecting pipes 13 and with liquid separator 4 via one or more other connecting pipes 12. Liquid separator 4 may be coupled with mixing tank 5 via one or more connecting pipes 14 and with sanitizer 10 via one or more other connecting pipes 16. Heated water outflow channel 8 may be one or more pipes that feed into a domestic hot water storage tank or other form of domestic hot water supply. System 20 may also optionally include a liquid outflow channel from sanitizer 10 that is one or more additional pipes 18. According to various embodiments, multiples of any of the components of system 20 may be provided.

Waste flows into system 20 through the building's sewage system 1. Water emptying into sewer system 1 from the building comes from sources such as water closets (WC, or "toilets"), bathtubs (BT, and/or showers), and sinks SK. Other sources may include dishwashers and washing machines, for example. In some embodiments, an emergency bypass 2 may connect with the building sewer system 1 to allow waste to bypass system 20 if there is a problem. Typically, this bypass 2 is not part of waste treatment system 20, although in some embodiments, system 20 may include bypass 2 or communicate with building sewer system 1 to provide an alert when there is a problem, so that waste may be diverted into bypass 2. After waste is processed in mixing tank 5, solid, processed waste 9 may be provided for use, for example as a fertilizer, or may alternatively be disposed of as residual waste. Greywater 11 may be pumped out of sanitizer 10 via a pump 22, which may be part of system 20 or separate from system 20. Greywater 11 may then be diverted back to the building or elsewhere for use, such as in toilets (WC).

Mixing tank 5 may be any suitable, commercial mixer, such as but not limited to high speed mixers, ribbon mixers, plough mixers, conical screw mixers, conical ribbon mixers, double shafts paddle mixers and continuous mixers. In various embodiments, oxidizing agent 6 may be loaded into mixing tank 5 before or after wastewater is passed into mixing tank 5. Heat is generated by mixing the organic waste in mixing tank 5 with a sufficient amount of oxidizing agent 6, which may be potassium permanganate or any other safe oxidizing agent. In one embodiment, oxidizing agent 6 may be stored in a compartment or container (not shown) in or connected to mixing tank 5 and dispensed into mixing tank 5 via one or more valves. Alternatively, oxidizing agent 6 may be manually dispensed into mixing tank 5 from an external source before or after waste is dispensed into tank 5. After processing, processed waste 9 may be removed from mixing tank 5, or alternatively, it may be channeled out of mixing tank 5 through a pipe or other means to a separate solid waste holding tank (not shown).

In addition to providing usable greywater and solid processed waste, system 20 may also provide heat from heat exchanger 7, which may be used as energy. For example, in one embodiment, heat may be applied to water and channeled via heated water channel 8 to a domestic hot water supply.

In one method of processing waste using system 20, a main sewage line 1 discharges into a holding tank 3 (or multiple holding tanks in some embodiments). Holding tank 3 (or tanks) will typically be designed to manage peak flows of the sewer to which it is attached. From holding tank 3, waste is channeled through one or more pipes 12 to liquid separator 4, which separates liquid from solid waste and thus reduces the water content of the solid waste to approximately 30% or less. Liquid waste is diverted through pipe(s) 16 to sanitizing tank 10. Solid matter is transferred through one or more pipes 14 to mixing tank 5. When oxidizing agent (such as potassium permanganate) 6 is mixed with solid waste, it starts an exothermic reaction, resulting in the generation of heat. This reaction may often start quickly, such as in less than one minute or even as quickly as approximately 20 seconds, and may produce large quantities of heat, such as temperature of about 200° F. The reaction will eventually convert the solid waste material to a dry, odorless, ash-like material. The resulting ash may be used as a fertilizer, for example. Tests of resulting ash material from one embodiment of the method have been conducted, and no phytotoxic signs were observed in a period of 30 days, indicating that the material is environmentally safe.

As previously mentioned, liquid separated from the solids is transferred to sanitizing tank 10. After sanitizing, greywater may be pumped through pipes 18, 11, using pump 22, to supply water closets (WC) with water for flushing and/or to supply greywater for other safe uses.

In one embodiment, system 20 may also include a heat source (not shown). The heat source may be used, for example, to catalyze or facilitate the exothermic reaction, such as by heating the solid waste before and/or during mixing with oxidization agent 6. The heat source may also be capable of incinerating or sterilizing waste, for example if additional incineration or sterilization is desired after the exothermic reaction is complete. The heat source may include, for example, a gas burner, laser heater, microwave heater, radiofrequency heater, electric resistance heater or the like. Heat transfer elements (e.g., metal rods or plates) may be provided to contact or even pierce the waste to accelerate heat transfer and water evaporation. In many embodiments, however, no heat source other than oxidizing agent 6 is needed, since mixing the waste with oxidizing agent 6 is sufficient for waste treatment needs.

In various alternative embodiments, waste treatment system 20 may include fewer or larger numbers of components than described above. For example, any one of the components described above, or any combination of components, may be provided in multiples (e.g., multiple holding tanks 3, multiple liquid separators 4, etc.). In some embodiments, one or more components may be removed from system 20. For example, in one embodiment, holding tank(s) 3 may be eliminated, and liquid separator(s) 4 may serve both as holding tanks and also as separators. In another example, pump 22 may be part of system 20 in some embodiments and not in others.

Figure 2:
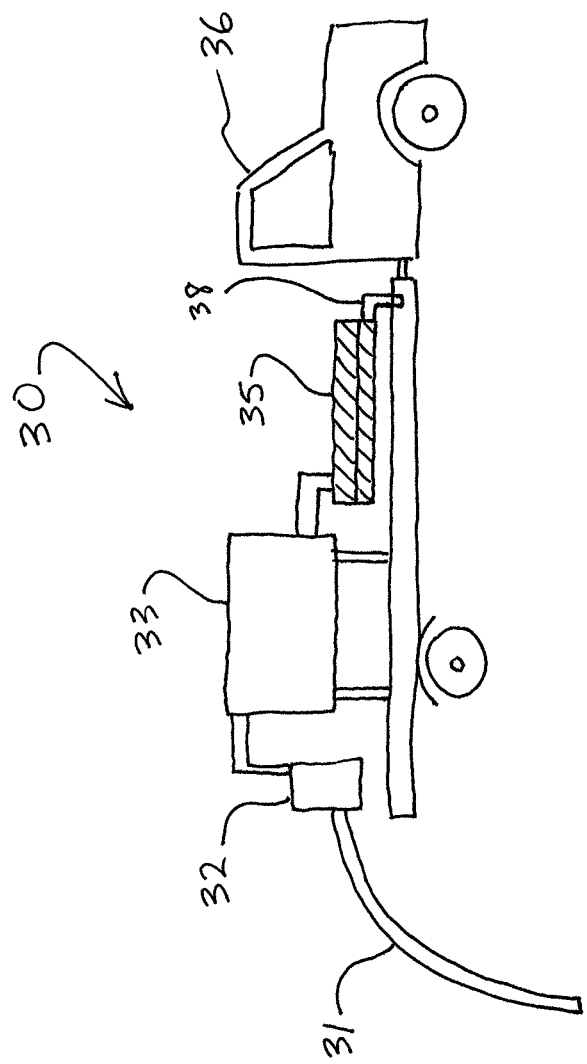
FIG. 2 is a side view diagram, illustrating a portable waste treatment system for installation and use on a truck, according to another embodiment.

Referring now to FIG. 2, in another embodiment, a waste treatment system 30 may be portable, for example for implementation and use on the back of a truck 36, such as the flatbed truck 36 pictured in FIG. 2. In this embodiment, waste treatment system 30 includes a sewer collection hose 31, a sewer pump 32, a holding tank 33, a mixing tank 35, and a fertilizer outflow channel 38. Sewer hose 31 and sewer pump 32 may be used to channel sewage directly out of a sewer into holding tank 33. Sewage may then be mixed with an oxidizing agent, such as potassium permanganate, in mixing tank 35, which may be a screw operated mixing tank or any other suitable mixing tank, such as but not limited to the examples listed above. Once waste is treated in mixing tank 35, resulting fertilizer may be diverted out of system 20 through fertilizer outflow channel 38.

In alternative embodiments, waste treatment system 30 may include any of a number of other configurations, combinations of components, sizes, shapes and the like, such as but not limited to one or more of the components or aspects described above in relation to FIG. 1. For example, waste treatment system 30 may include a liquid separator and a water outflow channel for separating water from solid waste and allowing the water to escape system 30. Additionally, system 30 may be sized to fit on any suitable truck or vehicle. Alternatively, waste treatment 30 system may be installed above ground or below ground at a sewer site.

Although this invention has been disclosed in the context of certain embodiments and examples, the present invention extends beyond the specifically disclosed embodiments to other alternative embodiments and/or uses of the invention and modifications and equivalents thereof. Thus, it is intended that the scope of the present invention herein disclosed should not be limited by the particular disclosed embodiments described above.

What is claimed is:

1. A waste treatment system, comprising:
   a liquid separator for substantially separating water from a solid waste or wastewater stream, wherein the liquid separator is directly upstream of:
      a sanitizing tank for treatment of a liquid waste separated from the solid waste or wastewater stream; and
      a mixing tank configured with a mechanical mixer for treatment of a separated dewatered solid waste having reduced water content; and
   an oxidizing agent container in direct communication with the mixing tank, wherein a supply of an oxidizing agent housed in the oxidizing agent container is directly dispensed from the oxidizing agent container into the mixing tank and mixed together with the dewatered solid waste having reduced water content with the mixer to facilitate an exothermic reaction within the mixing tank without requiring any input of heat,
   wherein the mixing tank comprises a heat exchanger connected to transfer heat from inside the mixing tank generated by the exothermic reaction caused by mixing the oxidizing agent with the dewatered solid waste.

2. The waste treatment system of claim 1, further comprising a holding tank connected between a sewage system of a building and the liquid separator to hold the solid waste from the sewage system before directing the solid waste into the liquid separator.

3. The waste treatment system of claim 2, further comprising:
   at least one first pipe connecting the holding tank with the liquid separator;
   at least one second pipe connecting the liquid separator with the mixing tank;
   at least one third pipe connecting the liquid separator with the sanitizing tank;
   at least one fourth pipe leading out of the heat exchanger to carry water heated from the heat exchanger; and
   at least one fifth pipe leading out of the sanitizing tank.

4. The waste treatment system of claim 2, further comprising an emergency bypass channel connected to the building sewage system, for diverting the waste to a public sewer system in case of failure of the waste treatment system.

5. The waste treatment system of claim 3, further comprising a pump connected to the at least one fifth pipe, for pumping sanitized water from the sanitizing tank toward the building for use as sanitized greywater.

6. The waste treatment system of claim 1, wherein the mixer is selected from the group consisting of high speed mixers, ribbon mixers, plough mixers, conical screw mixers, conical ribbon mixers, double shafts paddle mixers and continuous mixers.

7. The waste treatment system of claim 1, wherein the oxidizing agent comprises potassium permanganate.

8. The waste treatment system of claim 1, further comprising a heat outflow channel connected to the heat exchanger for allowing the heat generated by the exothermic reaction to be applied to a domestic hot water supply.

\* \* \* \* \*